[19] United States Patent
Kagawa

[11] Patent Number: 4,627,996
[45] Date of Patent: Dec. 9, 1986

[54] SODIUM-SULFUR STORAGE BATTERY AND A MANUFACTURING METHOD OF THE SAME

[75] Inventor: Hiroshi Kagawa, Takatsuki, Japan

[73] Assignee: Yuasa Battery Co., Ltd., Osaka, Japan

[21] Appl. No.: 792,742

[22] Filed: Oct. 30, 1985

[30] Foreign Application Priority Data

Dec. 7, 1984 [JP] Japan ................. 59-259594

[51] Int. Cl.$^4$ .................. H01M 10/00; B32B 3/06
[52] U.S. Cl. .................. 428/104; 429/104; 429/185
[58] Field of Search ............. 429/104, 185; 428/104

[56] References Cited

U.S. PATENT DOCUMENTS

| | | | |
|---|---|---|---|
| 3,883,367 | 5/1975 | Chiku et al. | 429/166 |
| 3,946,751 | 3/1976 | Breiter et al. | 429/166 |
| 3,959,013 | 5/1976 | Breiter | 429/185 |
| 4,024,319 | 5/1977 | Kagawa | 429/104 |
| 4,027,075 | 5/1977 | Nakabayashi et al. | 429/104 |
| 4,084,040 | 4/1978 | King | 429/104 |
| 4,510,217 | 4/1985 | Kagawa et al. | 429/104 |
| 4,530,151 | 7/1985 | Kagawa et al. | 29/623.1 |

Primary Examiner—John E. Kittle
Assistant Examiner—Patrick J. Ryan
Attorney, Agent, or Firm—Burns, Doane, Swecker & Mathis

[57] ABSTRACT

A manufacturing method of a sodium-sulfur storage battery wherein a negative cover is thermocompressively jointed to an upper surface of an alpha alumina ring which are jointed with solder glass to a solid electrolyte tube, and a positive cover is thermocompressively jointed to a lower surface of said alpha alumina ring, is characterized in that diffusion layers of chrome are provided on the surfaces of the negative and positive covers, coating layers of aluminum are provided at least on the surfaces, which are thermocompressively jointed, of the negative and positive covers, and thermocompressively jointing surfaces are thermocompressively jointed in the air with aluminum rings thereon, respectively. Said negative and positive covers may be made from stainless steel, iron or alloy of iron and nickel. Said chrome diffusion layers may be about $20\mu$–$120\mu$ in thickness, respectively, and said aluminum layers may be about $5\mu$–$90\mu$ in thickness, respectively.

7 Claims, 3 Drawing Figures

4,627,996

SODIUM-SULFUR STORAGE BATTERY AND A MANUFACTURING METHOD OF THE SAME

BACKGROUND AND SUMMARY OF THE INVENTION

The present invention relates to a sodium-sulfur storage battery and a manufacturing method of the same, and more particularly, to a structure and a method for thermocompressively jointing an alpha alumina ring of ceramic to positive and negative covers of metal.

Conventionally, in a sodium-sulfur storage battery, an alpha alumina ring is jointed to negative and positive covers by means of thermocompressively jointing. This thermocompressively jointing is effective to joint the metallic material such as the negative and positive covers together with the different material such as the ceramic therebetween to electrically insulated the covers to each other, and is broadly utilized to form a perfectly sealed structure of a battery such as the sodium-sulfur storage battery which is operated at a high temperature. However, the negative and positive covers of the sodium-sulfur storage battery must have sufficient resistance to chemical and electrochemical attack by molten sulfur and sodium, and thus, are made from stainless steel. Therefore, in a heated condition before they are thermocompressively jointed, the surfaces thereof may be oxidized, resulting in insufficient gastightness. In order to prevent the oxidization, the thermocompressively jointing is performed in an atmosphere of insert gas or reducing gas or in the vacuum. However, these processes or methods require expensive equipment, and must be of batch type, which has low productivity.

Accordingly, it is an object of the invention to provide an improved sodium-sulfur storage battery and a manufacturing method, by which productivity is improved and gastightness by thermocompressively jointing is also improved.

According to the invention, negative and positive covers, which are made from stainless steel, iron or alloy of iron and nickel and are thermocompressively jointed to an alpha alumina ring, are provided on the surfaces with chrome diffusion layers and are provided at least on the surfaces, which are thermocompressively jointed, with coating layers of aluminium, and are thermocompressively jointed in the air to the alpha alumina ring.

The embodiments of the present invention is described by way of example, with reference to the accompanying drawings.

DETAILED DESCRIPTION OF THE PREFERRED EMBODIMENT

Figure 1:
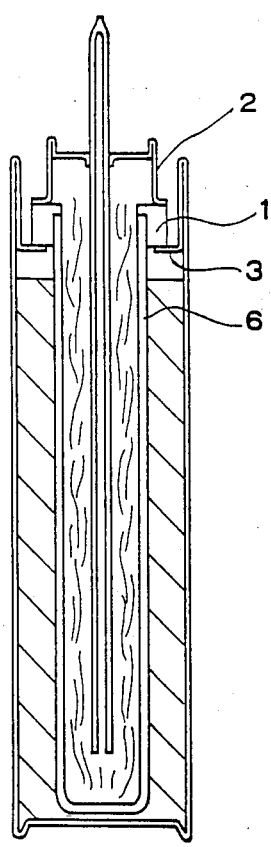
FIG. 1 is a sectional view of a sodium-sulfur storage battery manufactured by a manufacturing method according to the invention.
Figure 2:
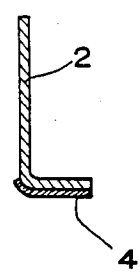
FIG. 2 is a sectional view of a negative cover used in a sodium-sulfur storage battery according to the invention.
Figure 3:
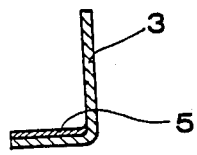
FIG. 3 is a sectional view of a positive cover used in a sodium-sulfur storage battery according to the invention.

Referring to FIG. 1, an alpha-alumina ring 1 is jointed with a solder glass to a solid electrolyte tube 6. Negative and positive covers 2 and 3 are thermocompressively jointed to upper and lower surfaces of the ring 1, respectively. The negative and positive covers 2 and 3 shown in FIGS. 2 and 3 are made of stainless steel (SUS304) plates of about 0.6 mm in thickness which are formed by a press machine into intended shapes. Diffusion layers of chrome of about $35\mu$ in thickness are provided at whole surfaces of the covers 2 and 3, respectively. Further, coating layers of aluminium of about $25\mu$ in thickness are provided by vacuum deposition at surfaces of the covers 2 and 3 to be thermocompressively jointed, respectively. Instead of the vacuum deposition, said aluminium coating layers may be formed by fusion binding in an atmosphere of reducing gas.

In tests, said negative and positive covers are heated to 600° C. with the alpha alumina rings therebetween, and are thermocompressively jointed in the air with aluminium rings between the thermocompressively jointing surfaces thereof under a pressure of about 6 tons. A conventional battery is also tested in a same condition. Negative and positive covers of the tested conventional battery are not provided with chrome diffusion layer and aluminium coating layer. The tests are performed by determining quantity of leaked helium. The tested batteries of the invention and of the conventional type are ten cells, respectively. The result of the test are described in a following table-1.

TABLE - 1

| Sort | Gastightness Quantity of Leaked Helium (bar · l/sec.) | | | | |
|---|---|---|---|---|---|
| | $-10^{-1}$ | $-10^{-3}$ | $-10^{-5}$ | $-10^{-7}$ | $10^{-7}$ |
| Invention | 0 | 0 | 3 | 6 | 1 |
| Conventional | 7 | 3 | 0 | 0 | 0 |

As shown in the table-1, seven cells among ten cells according to the invention could achieve the quantity of $10^{-5}$ bar.l/sec. or more, while seven cells among ten cells of the conventional type achieved the quantity of $10^{-1}$ bar.l/sec. or less. As apparent from the above, the gastightness is remarkably improved in the battery of the invention. Further, in the test, the thermocompressively jointed surfaces were peeled, and the peeled surfaces were observed. In the battery of the invention, in which intended width of the jointing surfaces is about 4 mm, annular surfaces of about 3.5 mm in width were actually jointed through the whole circumference, while, in the conventional battery, the stainless steel of the jointing surfaces was partially oxidized, so that they were imperfectly jointed, and further, the jointed surfaces were only about 1.5 mm in width. These are probably cause of the difference of the gastightness.

The present invention is not restricted to the shapes of the negative and positive covers, the conditions of the thermocompressively jointing and the method for forming the aluminium coating layers, which are described in connection with above embodiment.

According to the sodium-sulfur storage battery of the invention, as described above, the high gastightness can be achieved, and according to the manufacturing method, the thermocompressively jointing can be performed in the air, so that the equipment can be inexpensive, and the line production system can be employed, resulting in increasing of the productivity.

What is claimed is:

1. A sodium-sulfur storage battery comprising a solid electrolyte tube; and alpha alumina ring jointed with solder glass to the solid electrolyte tube; a negative cover thermocompressively jointed to the upper surface of said alpha alumina ring and a positive cover thermocompressively jointed to the lower surface of said alpha alumina ring, there being, diffusion layers of chrome provided on the surfaces of the negative and positive covers, and coating layers of aluminum provided at least on the surfaces, which are thermocompressively jointed, of the negative and positive covers.

2. A sodium-sulfur storage battery of claim 1 wherein said negative and positive covers are made from stainless steel, iron or alloy of iron and nickel.

3. A sodium-sulfur storage battery of claim 1 wherein said chrome diffusion layers are about $20\mu-120\mu$ in thickness, respectively, and said aluminium layers are about $5\mu-90\mu$ in thickness, respectively.

4. A manufacturing method of a sodium-sulfur storage battery wherein a negative cover is thermo-compressively jointed to an upper surface of an alpha alumina ring which are jointed with solder glass to a solid electrolyte tube, and a positive cover is thermocompressively jointed to a lower surface of said alpha alumina ring, there being diffusion layers of chrome provided on the surfaces of the negative and positive covers, coating layers of aluminum provided at least on the surfaces, which are thermocompressively jointed, of the negative and positive covers, and thermocompressively jointing surfaces thermocompressively jointed in the air with aluminum rings thereon, respectively.

5. A sodium-sulfur storage battery of claim 4 wherein said negative and positive covers are made from stainless steel, iron or alloy of iron and nickel.

6. A sodium-sulfur storage battery of claim 5 wherein said chrome diffusion layers are about $20\mu-120\mu$ in thickness, respectively, and said aluminium layers are about $5\mu-90\mu$ in thickness, respectively.

7. A sodium-sulfur storage battery of claim 1 wherein said diffusion layers of chrome are provided on whole surfaces of the negative and positive covers.

* * * * *